Patented Oct. 31, 1933

1,932,886

UNITED STATES PATENT OFFICE 1,932,886

THERAPEUTIC AGENT

Fitzgerald Dunning, Baltimore, Md., assignor to Hynson, Westcott & Dunning, Incorporated, Baltimore, Md., a corporation of Maryland No Drawing. Application March 25, 1933
Serial No. 662,838

8 Claims. (Cl. 167—70)

This invention relates to the use of the halogen derivatives of ortho-hydroxy benzyl alcohol and compositions or preparations containing the same as therapeutic agents.

The halogenated derivatives of ortho-hydroxy benzyl alcohol are known and may be prepared by known methods. So far as I am aware, however, their physiological properties have not heretofore been investigated and they have not been applied to therapeutic use.

I have discovered that these compounds generally possess properties admirably fitting them for certain therapeutic uses, particularly as antispasmodics.

They are, in the first place, suitable for therapeutic use with respect to their physical and chemical properties, i. e. they are crystalline, stable solids, practically odorless, generally sufficiently soluble in the usual vehicles and in the body fluids, non-toxic and non-irritating to animal tissue. They possess bactericidal properties which, as is apparent, are highly valuable properties in therapeutic agents to be used for purposes other than as antiseptics. They have excellent antispasmodic properties, adapting them for use in the treatment and relief of spastic conditions of muscular tissue and particularly of smooth muscular tissue. In addition they possess marked local anæsthetic properties which greatly enhance their value as clinical antispasmodics.

Numerous of the halogen derivatives of ortho-hydroxy benzyl alcohol have been tested, among which may be mentioned the mono- and di-chloro bromo and iodo derivatives, and mixed derivatives, such as the chloro-bromo, brom-iodo and chlor-iodo derivatives. In the mono-halogen derivatives the halogen generally occupies the position on the benzene nucleus para with respect to the hydroxyl group, while in the di-halogen derivatives the two halogens occupy positions ortho and para with respect to the hydroxyl group. The iodine derivatives are slightly yellow, while all others are white. Their solubility in water is limited but generally sufficient, i. e. 1 to 1000 or more in vitro and physiological salt solutions. In the case of the di-iodo derivative which, compared with the other derivatives, is relatively insoluble, the solubility in water is one part in twenty thousand.

All of the properties above referred to have been demonstrated by proper clinical experiments. For example, I have demonstrated by appropriate experiments on isolated surviving, living muscle tissue, such as strips of intestine, uterus, vas deferens, etc., of rat, guinea pig, rabbit and cat; that these tissues are relieved of artificial spasm by the action of the halogenated ortho-hydroxy benzyl alcohols, without killing the tissue. The di-iodo compound, although relatively insoluble, produced complete relaxation of intestinal muscle in concentrations as dilute as 1:20,000. I have further demonstrated by clinical application of the compounds in the treatment of renal colic, spastic disturbances of the stomach and similar disorders, that such symptoms are relieved.

The local anæsthetic properties of the compounds were determined by the usual tests, namely, duration of anæsthesia of the rabbit's cornea, and by the human introdermal wheal test. Other tests were made and studied on the sensory nerve endings of frogs' legs, on the conjunctivæ of cats and rabbits, and by the wheal method on guinea pigs. When applied in solid form to the tongue and mucous membranes of the mouth a definite anæsthesia was produced even by the relatively insoluble di-iodo compound.

The toxicity of the compounds, as determined by oral administration and intravenous injection is very low. Doses of 200 to 250 milligrams per kilogram of body weight, administered by stomach tube to rabbits, produced no harmful effects, and doses of 20 grams have been administered to human adults without apparent effect on the heart action, blood pressure or kidney or liver functions.

The antiseptic or bacteriological properties of the compounds have been determined by tests made in accordance with the recommendations of the United States Food and Drug Administration and the requirements of the Department of Agriculture. Although the antiseptic properties of the different compounds are different, all of them were found to be decidedly antiseptic. Tests made on the urine of normal human adults, after administration of various of the compounds, indicate that they produce either bactericidal or bacteriostatic urine.

The compounds may be applied in various forms, e. g. in solution either orally or by intramuscular injection, or orally in solid form such as tablets. Their most likely use is as antispasmodics for which purpose they are applied orally preferably in the form of soluble tablets. Tablets may be made up consisting almost entirely of the compounds or containing the usual inert ingredients used in the formation of tablets such as talc, stearic acid, paraffin oil, flavoring materials, etc., in varying amounts. Tablets suitable for oral administration may contain, for instance, 5 grams of the mono-brom derivative or 3 grams of the di-iodo derivative, together with suitable tablet forming ingredients.

A .5 percent solution of the mono brom ortho-hydroxy benzyl alcohol in water is useful as a local anæsthetic.

I claim:

1. A preparation suitable for clinical administration comprising a halogen derivative of ortho-hydroxy benzyl alcohol possessing antiseptic, anæsthetic and antispasmodic properties.

2. A preparation as defined in claim 1 in which the halogen derivative is a mono-halogen derivative.

3. A preparation as defined in claim 1 in which the halogen derivative is a di-halogen derivative.

4. A preparation as defined in claim 1 in which the halogen derivative is one of the group consisting of the mono- and diichlor, brom and iodo derivatives.

5. A preparation as defined in claim 1 in which the halogenated derivative is a brom ortho-hydroxy benzyl alcohol.

6. A preparation as defined in claim 1 in which the halogenated derivative is the mono brom ortho-hydroxy benzyl alcohol.

7. A preparation for oral administration as an antispasmodic comprising a halogen derivative of ortho-hydroxy benzyl alcohol.

8. A preparation as defined in claim 7 in the form of a tablet consisting essentially of a halogen derivative of the group consisting of the mono- and di-chlor, bromo and iodo derivatives of ortho-hydroxy benzyl alcohol.

FITZGERALD DUNNING.